Sept. 8, 1964
R. JOHNSON ET AL
3,148,210
RECYCLING VANADIUM AND COPPER MIXED CATALYST IN THE PREPARATION
OF ADIPIC ACID BY THE NITRIC ACID OXIDATION
OF THE PRECURSORS THEREOF
Filed June 23, 1960
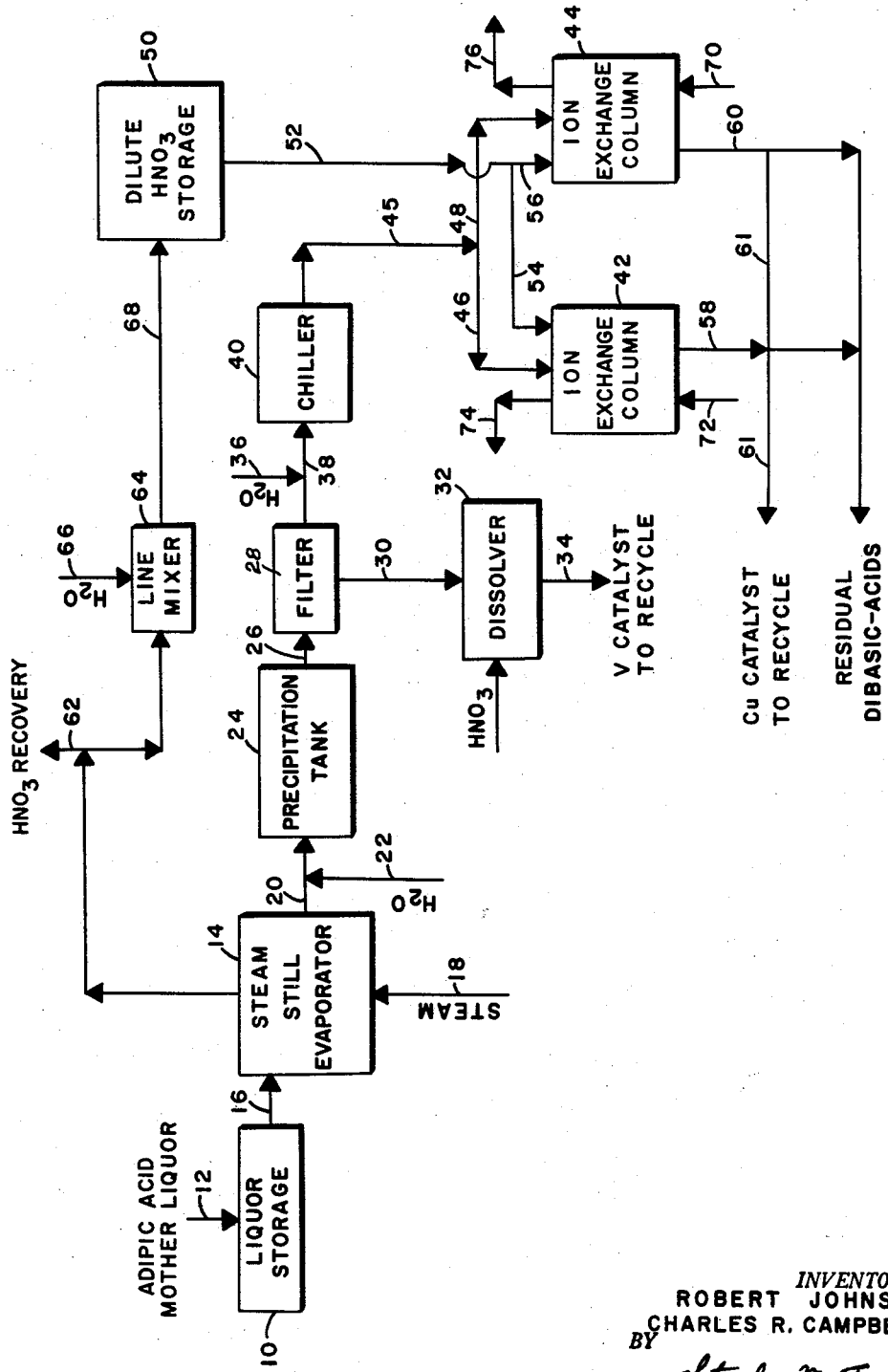
INVENTORS
ROBERT JOHNSON
CHARLES R. CAMPBELL
BY
*Stanley M. Tarter*
ATTORNEY

United States Patent Office 3,148,210
Patented Sept. 8, 1964

3,148,210
RECYCLING VANADIUM AND COPPER MIXED CATALYST IN THE PREPARATION OF ADIPIC ACID BY THE NITRIC ACID OXIDATION OF THE PRECURSORS THEREOF
Robert Johnson and Charles Russell Campbell, Pensacola, Fla., assignors, by mesne assignments, to Monsanto Company, a corporation of Delaware
Filed June 23, 1960, Ser. No. 38,383
4 Claims. (Cl. 260—531)

This invention relates to a catalyst recovery process and more particularly relates to the recovery of a specific mixed catalyst system from the "waste" liquors obtained during the manufacture of adipic acid by the oxidation of cyclohexanol and/or cyclohexanone with nitric acid.

A well known and commercial method of producing adipic acid, a valuable and widely used chemical, involves a series of steps including (1) the oxidation of cyclohexane in a liquid phase with air or other molecular oxygen-containing gas to a mixture of cyclohexanol and cyclohexanone at rather low conversion but high yields, (2) the separation of the unoxidized cyclohexane from the cyclohexanol and cyclohexanone intermediate reaction product, (3) the final oxidation of the intermediate material with a strong oxidizing agent such as nitric acid into adipic acid and concomitant minor amounts of other organic dibasic acids such as glutaric acid and succinic acid, and (4) isolation of the adipic acid from the by-product organic acids. A proposed method of carrying out the nitric acid oxidation of the said intermediate reaction product involves the use of a mixed catalyst system composed of vanadium and copper compounds. The adipic acid so produced is crystallized from the nitric acid oxidation product and separated from the adipic acid mother liquor. Contained in the mother liquor are the valuable catalyst compounds and soluble by-product organic dibasic acids. Heretofore economics of the process have dictated that the mother liquor be disposed of as waste, such as by buring the residual hydrocarbons, thereby losing the costly catalyst compounds.

Where vanadium compounds are used in the catayst mixture it has been suggested previously to recover such compounds by adjusting the pH of the "waste" liquor to a value in excess of 1.0 by the addition of an inorganic base such as sodium carbonate or hydroxide. The vanadium organic complex which precipitates then may be recovered by filtration and recycled to the nitric acid oxidation step. However, manifestly such procedure involves the addition of metal ions to the system, thereby giving rise to considerable processing difficulties. In accordance with another prior art procedure it has been suggested to add sulfuric acid to the "waste" liquors and to heat the resulting mixture until substantially all the nitric acid and water have been evaporated therefrom. Thereafter the catalysts and by-products are isolated from the residue. This latter method is not satisfactory since here again one must introduce in the system an extraneous material; and additional, expensive steps must be taken to separate the catalysts from the by-products isolated therewith. When the recovery of these valuable catalysts of copper and vanadium is attempted by first evaporating the waste liquors to dryness, a vigorous oxidation reaction occurs which renders the recovery in this manner very dangerous.

Therefore, an object of the present invention is to provide an improved method for recovering and reusing a copper-vanadium catalyst from "waste" liquor obtained in the manufacture of adipic acid by nitric acid oxidation of cyclohexanol and cyclohexanone mixtures whereby the problems normally attendant to the recovery of said catalyst are obviated.

A further object of the present invention is to provide for the recovery and reuse of the just mentioned copper-vanadium catalyst without the introduction of extraneous chemicals to the nitric oxidation system above described which might accumulate and be obnoxious therein upon continued recycling thereof.

These and other objects of the invention will become more readily apparent from the following detailed description.

In the method of this invention, the foregoing objects are realized broadly by subjecting the "waste" liquors obtained in the manufacture of adipic acid by nitric acid oxidation of cyclohexanol and cyclohexanone in the presence of copper-vanadium mixed catalyst at the point where adipic acid is crystallized and separated from other organic dibasic acids such as glutaric and succinic acid to controlled conditions inducing the nitric acid in the liquors to evaporate to such an extent that the pH thereof is raised to within the range of 1.2 and 2.2 as measured after dilution of the evaporated residue with water. The residue from the evaporation then can be diluted with water. Upon cooling the diluted residue, the vanadium component of the aforesaid mixed catalysts in the form of an organo-vanadium complex is selectively precipitated. In a suitable manner the vanadium precipitate is isolated from the mother liquor of the diluted residue for eventual reuse in the nitric acid oxidation of cyclohexanol and cyclohexanone. Thus, the vanadium precipitate can be dissolved in dilute nitric acid or the like and recycled to the feed material of the aforesaid nitric acid oxidation step. Preferably the mother liquor of the vanadium precipitation and separation is further diluted with water and cooled. This cooled, diluted mother liquor is brought into intimate contact with a polymerizate having cation exchange properties to effect substantially complete removal of the ionic copper in this mother liquor. The polymerizate to which the copper ions are bound is separated from the liquid medium in a suitable manner. Finally, the copper ions are eluted from the ion exchange polymerizate, such as by contacting the polymerizate with dilute nitric acid or other suitable eluting agents. The eluted copper ions can be recycled to the feed material of the aforesaid nitric acid oxidation step.

Referring in greater detail to the preferred practice of the invention, the first step includes the reduction of the nitric acid present in the mother liquor of the adipic acid precipitation and separation, the adipic acid having been produced by the nitric acid oxidation of cyclohexanol and cyclohexanone in the presence of a copper-vanadium mixed catalyst system. Nitric acid reduction or removal can be effected by bath, semi-continuous or continuous distillation under pressure and temperature conditions at which the nitric acid will evaporate from the aforesaid mother liquor. Preferably the mother liquor which, of course, contains the vanadium-copper catalyst to be removed is passed continuously through a steam still or like vessel used in distilling liquids at a temperature between 90 and 150° C. and at a pressure of 10 to 400 mm. Hg wherein substantially all the nitric acid and water are flashed overhead and condensed. This recovered nitric acid can be directed to an acid recovery system or used in whole or in part to regenerate the ion exchange resin employed to recover the copper component, if desired. The removal of nitric acid is continued without complete evaporation to dryness taking place until a pH after dilution of at least 1.2 but preferably not greater than 2.2 is obtained. The liquid residue of the nitric acid evaporation can be diluted with water for ease of material handling. While the quantity of dilution water may be varied considerably, it is preferred that the amount of water be from 0.75 to 4.0 times the weight of the residue of the evaporation. The precipitation of vanadium as an organo-metallic complex is effected such as by cooling the diluted residue to a suitably low temperature preferably below 100° C. but above 30° C. and by retaining same in a hold tank for a sufficient time to assure substantially complete precipitation. The preferred precipitation temperature is in the vicinity of 60° C. The vanadium precipitate is isolated from its ambient mother liquor by filtration, centrifuging, or by like known separation procedures. The vanadium compound can then be dissolved in nitric acid at a suitable temperature, and the resulting solution returned after being concentrated if desired in metered amounts to the stage where the cyclohexanol and cyclohexanone mixture is oxidized catalytically with nitric acid to adipic acid. The mother liquor from the vanadium separation is further diluted with water, if desired, and further cooled by any suitable means such as by the use of a heat exchanger or by introducing thereto cold water or the like to a temperature preferably below 35° C. In this case the preferred temperature range is in the vicinity of 20° C. to 30° C. The cooled liquor containing the copper catalyst, dissolved organic dibasic acids, water and some nitric acid at a temperature of 20° C. to 30° C. is passed through a column containing or intimately contacted in some other suitable manner with a cation exchange resin whereby to remove the copper ions from the liquor. The organic dibasic acids and the other material passing through the column may be burned or disposed of in some suitable manner. The copper component is eluted at a temperature of 20° C. to 30° C. from the cation exchange resin for reuse. For example, the dilute nitric acid recovered from the distillation of the mother liquor can be used to regenerate the resin and to remove the copper component from the said resin. Preferably, the eluant is nitric acid for obvious reasons, although other substances can be used. The elution liquor containing the dissolved copper compound can be returned after first being concentrated if desired to the nitric acid oxidation step. It is to be understood that the temperature at which the liquor contacts the cation exchange resin and the temperature at which the copper component is eluted are not critical and may vary from one type of resin to the next, the objective being that the temperature not be high enough to degrade the resin significantly.

In order to obtain a more complete understanding of the present invention, reference is now made to the accompanying drawing which is a schematic representation of a processing system suitable for recovery of the catalyst mixture. Adipic acid mother liquor is supplied to a liquor storage zone 10 through conduit 12. The material supplied to the said zone is the aqueous "waste" liquor obtained during the manufacture of adipic acid by the nitric acid oxidation of cyclohexanol and cyclohexanone in the presence of a copper-vanadium mixed catalyst, the copper having been added to the system as a soluble salt such as copper nitrate or the like and the vanadium having been added to the system as ammonium vanadate or the like. The liquor also contains an amount of organic dibasic acids such as glutaric acid and succinic acid which are inherently produced in the aforementioned nitric acid oxidation procedure. Because of the differences in solubilities of adipic acid and the said other homologous dicarboxylic acids, adipic acid is easily isolated therefrom by simple crystallization and separation methods. The aqueous mother liquor of the adipic acid crystallization is the starting material of the present process from which valuable catalytic compounds are recovered.

From the storage zone 10 the aqueous mother liquor is withdrawn batchwise, continuously or semi-continuously as required and passed into an evaporating means of a conventional type adapted for removing the resulting concentrate and liberated gases such as a steam still evaporator 14 via conduit 16. Steam is passed upwardly through the liquor fed to the evaporator, said steam being supplied to the evaporator by means of conduit 18. This steam sparge is continued until substantially all the nitric acid is removed from the mother liquor make. The residue remaining after evaporation is a free flowing liquid above 110° C. and exhibits melting points from 60° C. to 100° C. depending upon the dibasic acid content thereof which comprises glutaric acid and succinic acid, as well as some adipic acid. The other ingredients in the residue are the catalyst components and a small amount of water and traces amounts of nitric acid. It is within the purview of this invention to remove the nitric acid from the liquor by other techniques such as by the application of vacuum and heat to the liquor, as long as the pH thereof is increased to above 1.2 as measured after dilution by the evaporization of nitric acid therefrom without the introduction of a foreign chemical. Not introducing a foreign chemical to the system for adjusting the pH provides for the recovery of the catalytic components from the adipic acid mother liquor of improved quality while, at the same time, minimizes problems normally attendant to the known catalyst recovery operations.

From the evaporator 14 the evaporator tail is passed through conduit 20. During the passage through this conduit water is added to the tail material via conduit 22, and the total stream is then passed into a precipitation zone such as provided by the precipitation tank 24. The addition of water serves to assure that the tail material composed of the organic dibasic acids, small amounts of nitric acid and copper values remain in solution if desired and the vanadium component will precipitate at a convenient temperature, thereby providing ease of material handling. In the tank or on the way thereto the temperature of the evaporated tail can be decreased to bring about precipitation of the vanadium as an organic vanadium complex. It will be apparent that the temperature to which the evaporated tail is adjusted will depend, inter alia, upon the specific composition of the diluted evaporated tail, since the optimum precipitation temperature may vary from time to time, the preferred temperature being given above. Following this precipitation, the diluted material now containing the vanadium precipitate is filtered or separated in another manner to effect removal of the vanadium bearing substance. This can be accomplished by feeding the diluted material through conduit 26 to filter 28 wherein the aqueous phase is separated from the vanadium-containing precipitate. One of the several known type filters can be used for this step in the process. A rotary type of filter or one of the high speed types, such as a centrifuge can be utilized; or a pressure type filter can also be used. The vanadium precipitate is removed from the filter 28 in a conventional manner, and then the removed material is passed through conduit 30 to a dissolving tank 32. It is preferred to dissolve the precipitated vanadium-containing material with dilute nitric acid. The dissolved material can then be recycled by conduit 34 to the step in the production of adipic acid where cyclohexanol and cyclohexanone are oxidized to adipic acid with nitric acid.

The subsequent treatment of the liquid which passes through filter 28 depends upon the concentration of the dissolved material and the temperature thereof. It is usually preferred to dilute the liquid by the addition of water. This can be accomplished by supplying water through conduit 36 as the liquid is passed through conduit 38 to chiller 40. The chilling and diluting are suggested so that ordinary commercial ion exchange resins can be used conveniently, although it will be appreciated that these steps could be omitted when the resin selected is adapted to remove the copper ions from the liquid at other concentrations and temperatures. The chilled liquid is then passed through either ion exchange columns 42 or 44 which contains a cation exchange resin in a form such as a compact bed of beads. Where two or more columns are used, of course, the recovery process may be adapted so as to be continuous. While one column can be used in a semi-continuous process, two or more columns are preferred for obvious reasons. A solid cation exchange material to which the chilled liquid is inert is employed to effect removal of the copper ions therein. The ion exchange material can be a synthetic polymerizate which will react with the copper ions in the liquid and remove same therefrom. The material should also be capable of convenient regeneration to at least part of its original activity so that it may be used over and over again and should be insoluble in the liquid containing the copper ions. One suitable ion exchange material is a water-insoluble polymerizate of a mixture of a sulfonated polyvinyl aryl compound and a di-vinyl aryl compound. Such material is sold under the trademark IR-120 and DOW-50W and may be chemically identified as sulfonated polystyrene containing various levels of divinylbenzene as a cross linking agent. The chilled liquid is passed from the chiller 40 to the ion exchange columns via conduits 45–46 or 45–48 as the case may be. The liquid which emerges from the bottom of column 42 or column 44 contains in the main the residual dibasic acids composed of glutaric acid, succinic acid and adipic acid, together with some water and nitric acid. The liquid is disposed of in some suitable manner, which disposition normally includes burning the residual acids. The copper is eluted from the ion exchange resin in a suitable manner. It is preferred that dilute nitric acid be passed downwardly through the resin in column 42 and 44 from an acid storage tank 50 by means of conduits 52–54 or 52–56. The elution liquid containing the recovered copper catalyst component can then be recycled through conduit 58–61 or 60–61 to the step in the production of adipic acid where the mixture of cyclohexanol and cyclohexanone is oxidized with nitric acid. A convenient source of dilute nitric acid for storage tank 50 is provided from the overhead material recovered from evaporator 14. The nitric acid in the overhead material can either in whole or in part be directed to a recovery system by means of conduit 62. Alternately the overhead is diluted with water by means of a line mixer 64 provided with a water inlet line 66. The diluted acid is then passed to storage tank 50 through conduit 68. The columns 42 and 44 can be backwashed with water supplied by conduits 70 and 72 respectively and can be withdrawn by conduits 74 and 76 respectively.

In order to illustrate better the invention, the following example which exemplifies the invention but should not be constructed to limit the same is provided. The parts and percentages used therein below are by weight unless otherwise indicated.

EXAMPLE

As a feed material, adipic mother liquor was employed. Adipic acid produced by the nitric acid oxidation of cyclohexanol and cyclohexanone in the presence of a copper-vanadium catalyst was recovered from the oxidation reaction product in two steps. Firstly, adipic acid was crystallized from strong nitric acid and separated therefrom. In the second step the first mother liquor was concentrated by nitric acid removal with water being subsequently added. The diluted evaporated residue was cooled to form a second crop of adipic acid crystals. The mother liquor of the second crop was the feed material used in this example.

Nitric acid removal from a feed material was effected by both semi-continuous and continuous one plate distillation, as well as by steam sparging. The average composition of the feed material on a wet basis was 9.75 percent nitric acid, 4.42 percent adipic acid, 17.0 percent glutaric acid, 6.17 percent succinic acid, 1.9 percent copper nitrate and 0.2 percent vanadium compound.

In the semi-continuous evaporation the mother liquor was fed continuously into a three liter flask heated by an electric mantle surrounding the flask. A pressure of 144 mm. of Hg was maintained during the evaporation. The feed rate was controlled by the pot temperature which was maintained at 110°±5° C. The water and nitric acid vapors flashed overhead were condensed and analyzed for total acidity. The residue was allowed to build up in the pot until the end of the nitric acid distillation. The residue remaining in the pot was a dark free-flowing liquid at 90° C. This substance was cooled to a solid, pulverized, and analyzed for nitric acid, organic dibasic acids and catalyst.

Continuous evaporation of the feed material was made in a unit comprising an electrically heated glass reboiler with provision having been made for continuous feed of the mixture and continuous removal of the residue. The distillate was condensed in a glass head over the feed section. Operating pressure was 140 mm. of Hg and the feed rate was adjusted to maintain a base temperature of 105–110° C.

Steam sparging of the feed material was made in a conventional unit. Operating pressure during the steam distillation was 140 mm. of Hg and the feed rate was adjusted to maintain a base temperature of 120° C.

The residues remaining after evaporations, as above indicated, were free-flowing liquids above 110° C. They exhibited melting points ranging from 60–110° C. depending upon the organic dibasic acid composition. A typical composition of the residues was 0.47 percent copper, 0.17 percent vanadium, 3.2 percent water, 23.4 percent adipic acid, 36.7 percent glutaric acid and 29.7 percent succinic acid.

An equal weight of water was added to the residue and the mixture was heated and stirred at 60° C. to effect dissolution of the residue except for the vanadium component. Below 60° C. crystallization of organic dibasic acids occurred at this concentration and such crystallization should be avoided. The undissolved vanadium-containing material was an organo-vanadate complex and was recovered by filtration in a conventional manner. It was found that a pH equivalent to 1.5 at 25° C. of the residue resulted in the highest recovery of vanadium compound. The effect of pH on the percent recovery of vanadium compound and the vanadium content in the undissolved residue may be observed in Table 1 below.

Table 1

| pH: | Percent V recovered |
|---|---|
| 1.4 | 70.0 |
| 1.5 | 72.7 |
| 1.8 | 64.4 |
| 2.0 | 42.0 |

At a pH below 1.2 recovery dropped markedly.

The recovered vanadium compound was evaluated as a catalyst component in the conventional nitric acid oxidation of cyclohexanol and cyclohexanone. No significant variations between oxidations catalyzed with recovered vanadium and oxidations catalyzed with fresh ammonium meta-vanadate were observed. The oxidation reaction catalyzed with recovered vanadium material proceeded normally and resulted in equivalent yields of adipic acid. The recovered vanadium precipitate was relatively insoluble in 45 percent nitric acid but was easily dissolved in 10–20 percent nitric acid. The dissolved vanadium compound can then be processed for recycling to the nitric acid oxidation step.

The solution from the vanadium separation was diluted to an organic dibasic acid content of about 30 weight percent to prevent crystallization of the dibasic acids at the normal operating temperature 30–35° C. A copper recovery of 90 percent was obtained by passing the solution through a bed of Rohm and Haas cation exchange resin IR-120 (hydrogen form). The bed was contained in a 1 inch (I.D.) glass column packed to a bed depth of two feet with the aforesaid resin. The flow rate through the column was controlled by the liquid head maintained above the bed and by valve means at the bottom of the column. The reaction rate between the copper ions and the resin was rapid. An interesting phenomenon was noted during copper absorption. The copper ions were absorbed substantially quantatively on the resin to leave a sharp green band easily seen against the normal brown color of the resin. No leakage of copper ions from the column could be detected until the band progressed to a point at the bottom of the bed.

After the resin bed was loaded, the copper ions were eluted and the resin was regenerated by passing a stream of dilute nitric acid through the column. The elution acid concentration was about 8 percent or less to prevent appreciable degradation of the resin. The recovered copper compounds, cupric nitrate, was evaluated as a catalyst component in the conventional nitric acid oxidation of cyclohexanol and cyclohexanone. The oxidation reaction catalyzed with recovered copper catalyst proceeded normally and resulted in good yields of adipic acid.

By the practice of the invention as before described numerous advantages have been found to result. Firstly, the valuable catalyst mixture of copper and vanadium compounds and nitric acid that would normally be removed and lost from the system are recovered by the disclosed process. Secondly, the catalytic material is recovered as a product of high purity and reactivity. Thirdly, when reuse of the catalyst mixture and nitric acid recovered from the system is made, an economic advantage is attained. Moreover, the aforedescribed process can be carried out without a waste disposal problem of the recovered substances.

Various modifications of the invention described above will be apparent to those skilled in the art. Hence, it will be understood that the invention is not limited to the foregoing description or annexed drawing thereof except as it is defined in the appended claims.

What is claimed is:

1. A process for the removal and recovery of copper-vanadium mixed catalysts from the liquor obtained in the crystallization and separation of adipic acid manufactured by nitric acid oxidation of cyclohexanol and cyclohexanone in the presence of said catalysts which comprises the steps of:

(a) heating said liquor at a temperature of 90–150° C. and under a pressure of 10–400 mm. of Hg to evaporate the nitric acid therefrom;
(b) continuing the heating until the nitric acid content is reduced to the extent that the pH of the evaporated residue after dilution is between 1.2 and 2.2 as measured at 25° C.;
(c) cooling the evaporated residue to precipitate selectively the vanadium component of said mixed catalysts in the form of an organo-vanadium complex;
(d) separating the precipitated organo-vanadium complex from its mother liquor;
(e) dissolving the organo-vanadium complex in nitric acid;
(f) intimately contacting said mother liquor with a polymerizate having cation exchange properties to effect removal of the copper component of said mixed catalyst by the chemical binding of the copper in ionic form to said polymerizate;
(g) contacting the said polymerizate with dilute nitric acid to remove the copper ions therefrom;

and recycling the resulting vanadium-containing solution of step e and the resulting copper-containing solution of step g to the nitric acid oxidation of cyclohexanol and cyclohexanone operation.

2. The process of claim 1 wherein water is added to the evaporated residue to dilute same.

3. The process of claim 2 wherein the mother liquor resulting from the separation of the precipitated organo-vanadium complex is diluted with water and cooled to a temperature above that at which the dissolved organic dibasic acids therein precipitate.

4. The process of claim 3 wherein the heating of the liquor to evaporate nitric acid therefrom is accomplished by the action of steam.

References Cited in the file of this patent

UNITED STATES PATENTS

| 2,791,566 | Jeffers | May 7, 1957 |
| 2,971,010 | Gilby et al. | Feb. 7, 1961 |
| 3,106,450 | Van den Berg | Oct. 8, 1963 |